(12) United States Patent
Krummrich et al.

(10) Patent No.: US 10,637,081 B2
(45) Date of Patent: Apr. 28, 2020

(54) RECIRCULATION FUEL CELL

(71) Applicants: THYSSENKRUPP MARINE SYSTEMS GMBH, Kiel (DE); thyssenkrupp AG, Essen (DE)

(72) Inventors: Stefan Krummrich, Padenstedt (DE); Hans Pommer, Barkelsby (DE)

(73) Assignees: THYSSENKRUPP MARINE SYSTEMS GMBH, Kiel (DE); THYSSENKRUPP AG, Essen (DE)

( * ) Notice: Subject to any disclaimer, the term of this patent is extended or adjusted under 35 U.S.C. 154(b) by 231 days.

(21) Appl. No.: 15/575,104

(22) PCT Filed: May 18, 2016

(86) PCT No.: PCT/EP2016/061137
§ 371 (c)(1),
(2) Date: Nov. 17, 2017

(87) PCT Pub. No.: WO2016/188822
PCT Pub. Date: Dec. 1, 2016

(65) Prior Publication Data
US 2018/0151896 A1    May 31, 2018

(30) Foreign Application Priority Data

May 28, 2015  (DE) .................. 10 2015 209 804

(51) Int. Cl.
| | |
|---|---|
| *H01M 8/04089* | (2016.01) |
| *H01M 8/04119* | (2016.01) |
| *H01M 8/0432* | (2016.01) |
| *H01M 8/04791* | (2016.01) |
| *H01M 8/102* | (2016.01) |
| *H01M 8/1018* | (2016.01) |

(52) U.S. Cl.
CPC ..... *H01M 8/04097* (2013.01); *H01M 8/0435* (2013.01); *H01M 8/04126* (2013.01); *H01M 8/04156* (2013.01); *H01M 8/04335* (2013.01); *H01M 8/04798* (2013.01); *H01M 8/102* (2013.01); *H01M 2008/1095* (2013.01); *H01M 2250/20* (2013.01); *Y02T 90/32* (2013.01)

(58) Field of Classification Search
CPC ......... H01M 8/04097; H01M 8/04126; H01M 8/04156; H01M 8/04335; H01M 8/0435; H01M 8/102; H01M 2008/1095; H01M 2250/20; Y02T 90/32
See application file for complete search history.

(56) References Cited

U.S. PATENT DOCUMENTS

| | | | | |
|---|---|---|---|---|
| 6,461,751 B1 * | 10/2002 | Boehm | ............. | H01M 8/04089 429/432 |
| 6,506,510 B1 * | 1/2003 | Sioui | ................. | H01M 8/04014 429/411 |
| 6,841,280 B2 * | 1/2005 | Iio | ........................... | C01B 3/501 429/415 |
| 6,969,561 B2 * | 11/2005 | de Vaal | ............. | H01M 8/04223 429/442 |
| 2006/0251938 A1 * | 11/2006 | Kamihara | ......... | H01M 8/04029 429/431 |
| 2007/0065711 A1 | 3/2007 | Gopal | | |
| 2016/0204457 A1 | 7/2016 | Brandt | | |

FOREIGN PATENT DOCUMENTS

| | | |
|---|---|---|
| DE | 10313470 B | 9/2004 |
| DE | 102008034807 B | 10/2009 |
| EP | 1630098 A | 3/2006 |
| EP | 2840636 A | 2/2015 |
| JP | 2004158229 A | 6/2004 |
| JP | 2007193951 A | 8/2007 |
| JP | 2013101962 A | 5/2013 |
| KR | 20070045774 A | 5/2007 |
| WO | 2000/63993 A1 | 10/2000 |
| WO | 2005/064730 A2 | 7/2005 |

OTHER PUBLICATIONS

English Translation of International Search Report issued in PCT/EP2015/068655, dated Oct. 13, 2015 (mailed Oct. 20, 2015).
English abstract of DE10313470B.
English abstract of EP2840636A.

* cited by examiner

*Primary Examiner* — Anca Eoff
(74) *Attorney, Agent, or Firm* — thyssenkrupp North America, Inc.

(57) ABSTRACT

A recirculation fuel cell device, which can be utilized on a submarine, may include a fuel cell with an anode side and a cathode side, wherein both the anode and cathode sides have input and output sides. The device may include a first inlet for oxygen and a second inlet for hydrogen. The device may further include a cathode-side connection between the output side of the cathode side and the input side of the cathode side, and an anode-side connection between the output side of the anode side and the input side of the anode side. A water separator may be disposed in the cathode-side connection, and a gas discharge valve for a continuous release of process gases may be disposed on the output side of the cathode side of the fuel cell. Operation of the device may involve recirculating an anode gas stream in its entirety.

10 Claims, 1 Drawing Sheet

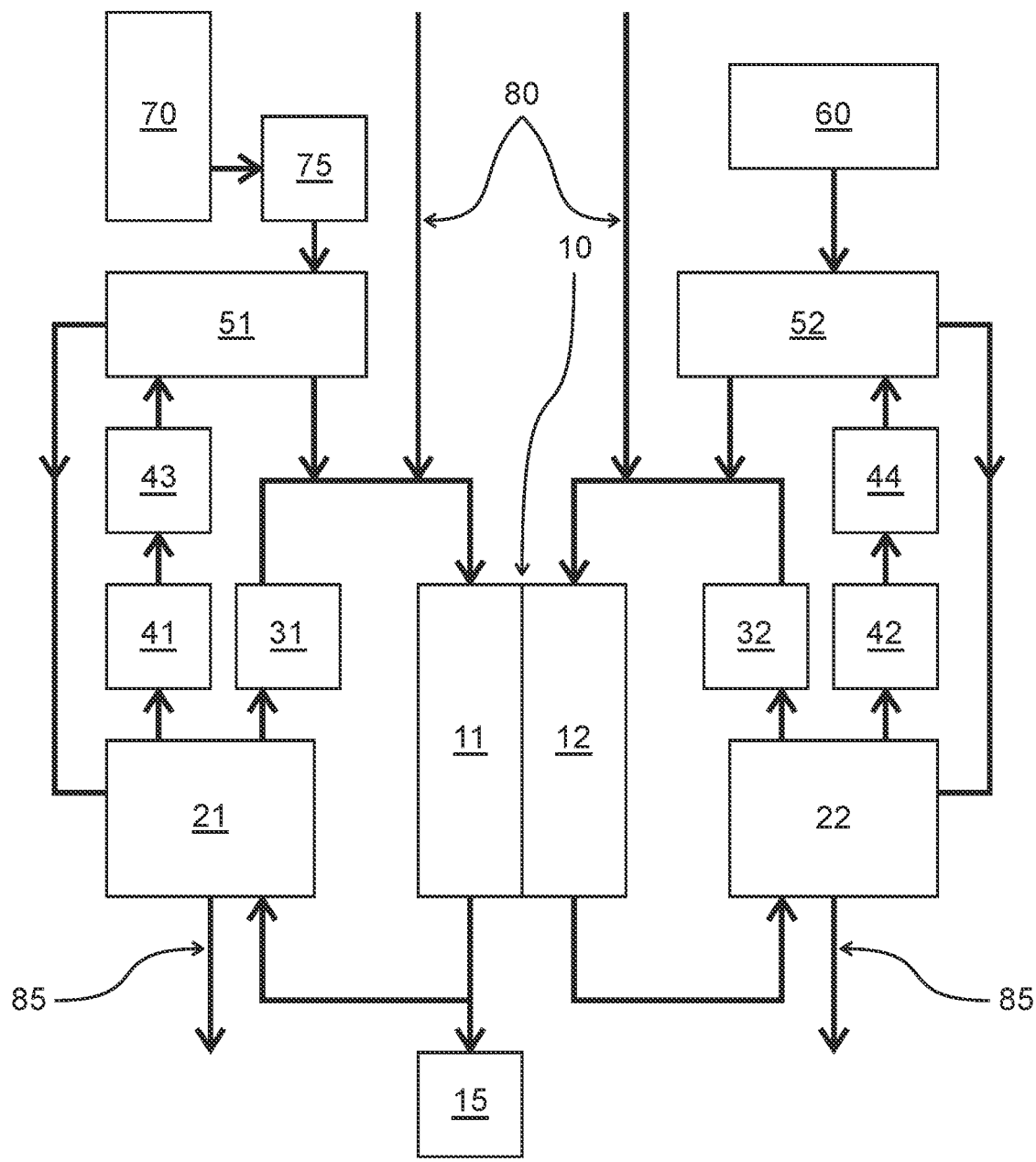

RECIRCULATION FUEL CELL

CROSS REFERENCE TO RELATED APPLICATIONS

This application is a U.S. National Stage Entry of International Patent Application Serial Number PCT/EP2016/061137, filed May 18, 2016, which claims priority to German Patent Application No. DE 10 2015 209 804.4 filed May 28, 2015, the entire contents of both of which are incorporated herein by reference.

FIELD

The present disclosure generally relates to fuel cell devices, including recirculation fuel cell devices that minimize the emission of reactants.

BACKGROUND

A circulation-type fuel cell in which inert gas is eliminated is known from EP 2 840 636 A1.

A fuel cell with a reactant outlet is known from US 2007/0065711 A1.

Inert gases are gases which are not reacted inside the fuel cell and behave inertly. The most important inert gases are nitrogen ($N_2$) and argon (Ar). Others include helium (He) and neon (Ne), for example. Other inert gases can include the heavier noble gases and unreactive halogenated hydrocarbons.

The release of reactants and in particular hydrogen to the environment has proved disadvantageous, especially when operating fuel cells in enclosed spaces, and most especially inside a submarine. In enclosed spaces the release of both hydrogen and oxygen can be critical, due to the formation of detonating gas in the first case and the build-up of toxic concentrations in the second. The fire risk can also increase.

BRIEF DESCRIPTION OF THE FIGURE

FIG. 1 is a schematic diagram of an example recirculation fuel cell device.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The main problem addressed by the invention present disclosure is that of discharging from the fuel cell the inert gas introduced with the reactants while minimizing the emission of reactants, in particular hydrogen, in the process.

The recirculation fuel cell device in accordance with the invention comprises at least one fuel cell, a first inlet for oxygen, a second inlet for hydrogen, and a first water separator. The fuel cell comprises an input side and an output side, along with an anode side and a cathode side. The reactants (oxygen and hydrogen) are supplied to the fuel cell on the input side, and the product (water) is discharged on the output side. The oxidation of hydrogen ($H_2$) to protons ($H^+$) takes place on the anode side, while the reduction of oxygen ($O_2$) to oxide ($O^{2-}$) takes place on the cathode side, the passage of the protons through the membrane forming water ($H_2O$). The first inlet for oxygen is connected to the input side of the cathode side of the fuel cell, and the second inlet for hydrogen is connected to the input side of the anode side of the fuel cell. The device comprises a cathode-side connection, wherein the cathode-side connection is a connection between the output side of the cathode side of the fuel cell and the input side of the cathode side of the fuel cell. The device further comprises an anode-side connection, wherein the anode-side connection is a connection between the output side of the anode side of the fuel cell and the input side of the anode side of the fuel cell. The cathode-side connection is used to recirculate the oxygen that has not reacted in the fuel cell, while the anode-side connection serves to recirculate the hydrogen that has not reacted in the fuel cell. The first water separator is arranged in the cathode-side connection. The water separator is used to separate off the water formed in the fuel cell and removes it from the circuit. On the output side of the cathode side of the fuel cell the device comprises a gas discharge valve for the continuous release of process gases. A portion of the cathode gas stream leaving from the output side of the cathode side of the fuel cell can be discharged via the gas discharge valve and thus removed from the circuit. In particular, the inert gases introduced with the oxygen and contained as impurities in the oxygen can be removed from the circuit through this outlet, thereby preventing a deterioration in the efficiency of the fuel cell owing to the reduction in the oxygen partial pressure. The concentration of inert gas in the cathode gas stream can be selectively adjusted via the amount of the portion released through the gas discharge valve. The continuous release allows for a selective adjustment of the amount of oxygen released. This also promotes a stable operating state, even with a variable inert gas concentration.

The fuel cell is particularly preferably a polymer electrolyte membrane fuel cell (PEM fuel cell). A sulfonated tetrafluoroethylene polymer, for example Nafion (DuPont) or Flemion (Asahi), is particularly preferably used as the polymer electrolyte membrane.

The fuel cell can be an individual fuel cell, a number of individual fuel cells connected in parallel, or a stack, in other words a number of individual, separate fuel cells connected in series.

The recirculation fuel cell device can optionally comprise a second water separator, wherein the second water separator is arranged in the anode-side connection. When using a PEM fuel cell in particular, it is advantageous to add water to the reactants to extend the useful life of the membrane. Water can also be diffused through certain membranes. Therefore, to further reduce the amount of water, the second water separator can preferably be provided in the anode gas stream.

In a further embodiment of the invention, the device is designed to recirculate in its entirety the anode gas leaving from the output side of the anode side of the fuel cell. Recirculating in its entirety the anode gas leaving from the output side of the anode side of the fuel cell can prevent an emission of hydrogen. This avoids the need to provide a hydrogen oxidation device downstream from the recirculation fuel cell device. In addition, the hydrogen is reacted in its entirety, so losses can be avoided. Since storing hydrogen is very complex, using and converting the stored hydrogen in its entirety is especially advantageous.

In a further embodiment of the invention, the gas discharge valve on the cathode side is a throttle valve. The use of a throttle valve enables a relatively small portion of the cathode gas stream to be separated off and released to the surrounding air. In this way a relatively simple and not actively regulated release of the inert gas to the surrounding air is possible.

In a further embodiment of the invention, the gas discharge valve can be regulated to adjust the inert gas concentration. The inert gas concentration can be adjusted selectively and safely by altering the discharge of gas. If the discharge of gas is reduced, the inert gas concentration in the recirculation fuel cell device increases. With a higher inert gas concentration, less oxygen is released to the environment. Increasing the discharge of gas has the opposite effect. In this way the amount of oxygen released can be directly adjusted to the consumption of oxygen in the environment.

In a further embodiment of the invention, the device comprises a first oxygen sensor, wherein the first oxygen sensor detects the oxygen concentration in the surrounding air. If the oxygen concentration in the surrounding air rises above a critical limit, the amount of the cathode gas stream released via the gas discharge valve can be reduced. This does increase the concentration of inert gas in the fuel cell, reducing the efficiency of the fuel cell. At the same time, however, once a new equilibrium has been established, if the release of inert gas remains the same then the release of oxygen is reduced owing to the lower concentration of oxygen in the cathode gas stream, such that the oxygen concentration in the surrounding air can be held below a threshold value of 15% to 25%, particularly preferably below 21%, most particularly preferably below a threshold value that is hazardous to human health.

In a further embodiment the gas discharge valve can be regulated to adjust the inert gas concentration on the basis of the oxygen concentration in the surrounding air as detected by the first oxygen sensor. If the oxygen concentration in the environment increases, for example, the discharge of gas is reduced, and the inert gas concentration in the recirculation fuel cell device increases. This causes less oxygen to be released through the discharge of gas. If the oxygen concentration in the environment falls, the discharge of gas can be increased, and the inert gas concentration in the recirculation fuel cell device falls. This causes more oxygen to be released through the discharge of gas.

In a further embodiment of the invention, the device comprises a second oxygen sensor, wherein the second oxygen sensor detects the oxygen concentration at the output side of the cathode side of the fuel cell. The use of the second oxygen sensor is advantageous for operating the recirculation fuel cell device with an optimum inert gas concentration. The optimum is determined from the lowest possible inert gas concentration for efficiency, the highest possible inert gas concentration for minimizing the oxygen emission, and the most constant possible inert gas concentration for optimizing the useful life of the fuel cell and a constant power output by the fuel cell. The second oxygen sensor can be used to selectively adjust the oxygen concentration in the cathode gas stream, a concentration of 40 to 70 mol %, preferably 45 to 60 mol %, having proved optimal.

In a further embodiment of the invention, the device comprises a first humidifier, wherein the first humidifier is connected to the first inlet for oxygen.

In a further embodiment of the invention, the device comprises a second humidifier, wherein the second humidifier is connected to the second inlet for hydrogen.

The reactant gases are conventionally used virtually dry, in other words with a moisture content (relative humidity) of virtually 0%. Common storage forms such as liquid oxygen, hydrogen from a metal hydride storage system or hydrogen or oxygen from a compressed gas tank contain virtually no moisture, owing to the way in which they are stored. If dry reactants are used, however, the fuel cell membrane has a shorter useful life. It is thus advantageous to wet the reactants, particularly preferably to virtually saturate the water content, in other words to establish a moisture content (relative humidity) of 80 to 100%, particularly preferably of 90 to 100%.

In a further embodiment of the invention, the device comprises a first storage vessel for liquid oxygen. Liquid oxygen has proved to be particularly efficient. The gaseous oxygen is preferably obtained from the liquid oxygen using an evaporator and a superheater.

In a further embodiment of the invention, the device comprises a metal hydride storage system for hydrogen. Hydrogen obtained from a metal hydride storage system contains virtually no inert gases. This simplifies operation of the fuel cell. Moreover, in comparison to pressurized hydrogen or liquid hydrogen, hydrogen stored as metal hydride is much easier to handle and the storage yield is higher. Alternatively or additionally, the device comprises a reformer for producing reformer gas. In a reformer, diesel for example is converted with water and/or oxygen into hydrogen and carbon monoxide or carbon dioxide.

In a further embodiment of the invention, the cathode-side connection comprises a cathode-side compressor and the anode-side connection comprises an anode-side compressor. The compressors serve to compensate for the pressure losses in the fuel cell. The compressors are particularly preferably arranged downstream of the water separators. This arrangement prevents condensation inside the compressors. Furthermore, the temperature of the recirculated gas stream is preferably reduced inside the water separator from the temperature exhibited by the gas stream at the output side of the fuel cell to the temperature exhibited by the gas stream at the input side of the fuel cell. Since heat is formed during the reaction inside the fuel cell, the gas stream heats up inside the fuel cell, thus generating the temperature gradient. As the gases preferably have a relative humidity close to 100%, lowering the temperature in the anode-side or cathode-side connection would cause condensation.

In a further embodiment of the invention, the recirculation fuel cell device comprises a third inlet, wherein the third inlet is connected to the input side of the anode side of the fuel cell and wherein inert gas can be supplied through said third inlet. When starting up the fuel cell in particular, it is advantageous to adjust the desired inert gas concentration directly by adding inert gas. This is particularly advantageous, since the density of the anode gas can vary greatly depending on the composition; for example, from pure hydrogen to a mixture of 50% hydrogen and 50% argon, for example, the density increases approximately tenfold. The fluidic properties, for example the behavior inside a compressor, are strongly influenced by this. Adding inert gas when starting up the fuel cell is thus advantageous.

In a further embodiment of the invention, the recirculation fuel cell device comprises a fourth inlet, wherein the fourth inlet is connected to the input side of the cathode side of the fuel cell and wherein inert gas can be supplied through said fourth inlet. On the cathode side too it is advantageous to add inert gas when starting up the fuel cell. Although the density and hence the fluidic properties of the cathode gas do not vary so widely on the cathode side, an increased proportion of inert gas leads to a changed potential on the cathode side of the fuel cell due to the changed partial pressure of the oxygen. To ensure as constant an operation as possible and hence to achieve a maximum useful life for the fuel cell, adding inert gas is also advantageous on the cathode side.

In a further aspect the invention concerns a method of operating a recirculation fuel cell device, in which the cathode gas is recirculated and the anode gas is recirculated. A portion of the cathode gas stream is continuously removed from recirculation at the output side of the cathode side of the fuel cell and released to the surrounding air. The anode gas stream is recirculated in its entirety. The continuous release allows for a selective adjustment of the amount of oxygen released. This also promotes a stable operating state, even with a variable inert gas concentration.

Recirculating the anode gas stream in its entirety avoids the release of hydrogen to the atmosphere, and this is associated with a number of advantages. Firstly, the release of potentially hazardous hydrogen (risk of detonating gas formation) is avoided. Secondly, there is no need for a special device for specifically oxidizing the hydrogen released to the surrounding air. And thirdly, the hydrogen is converted in its entirety in this way.

In a further embodiment of the invention, the inert gas concentration is regulated by the discharge of gas through the gas discharge valve.

In a further embodiment of the invention, the amount of oxygen released by the discharge of gas through the gas discharge valve is regulated such that the oxygen concentration in the surrounding air is kept approximately constant. Approximately constant is understood to mean a variation in the oxygen concentration of ±4 mol %, preferably of ±2 mol %.

In a further embodiment of the invention, the release of the portion of the cathode gas stream is regulated in such a way that through the release of the portion of the cathode gas stream, the oxygen concentration in the surrounding air does not exceed a value of 25 mol %, preferably 23 mol %, particularly preferably 21 mol %. By monitoring the oxygen concentration in the surrounding air and by actively regulating the release of the portion of the cathode gas stream, a hazard in the environment of the recirculation fuel cell device, especially to humans, can be reduced in an optimal manner.

In a further embodiment of the invention, the amount of oxygen released with the portion of the cathode gas stream is adjusted via the inert gas concentration at the output side of the cathode side of the fuel cell.

In a further embodiment of the invention, the inert gas concentration at the output side of the cathode side of the fuel cell is increased to reduce the oxygen released with the portion of the cathode gas stream.

By reducing the release of the portion of the cathode gas stream, the release of inert gas is reduced, so that, through the impurities in the oxygen, more inert gas is introduced into the circuit than is discharged from it. In this way the inert gas concentration rises until, through the increased inert gas concentration due to the reduced amount of the portion of the cathode gas stream, the same amount of inert gas is released as is introduced. The discharge of oxygen is reduced in this way.

Correspondingly, by increasing the portion of the cathode gas stream, the concentration of inert gas can be lowered and hence the release of oxygen to the environment increased.

In a further embodiment of the invention, the inert gas concentration at the output side of the cathode side of the fuel cell is adjusted to 40 to 70 mol %, preferably to 45 to 60 mol %, particularly preferably to 45 to 55 mol %. As is clear for example from EP 2 840 636 A1, this range is not preferred, since the output of the fuel cell is already impaired in this range. Nevertheless, this range has proved to be advantageous in accordance with the invention, since it allows for a constant discharge of inert gas with a comparatively low release of oxygen to the environment. With a typical content of 0.5% inert gas in the oxygen (technical purity, 99.5%), a proportion of just 0.5% of the oxygen used is released to the surrounding air and is thus lost to energy generation.

In a further embodiment of the invention, the inert gas concentration at the output side of the cathode side of the fuel cell and the inert gas concentration at the output side of the anode side of the fuel cell are adjusted so as to be equal. Equal inert gas concentrations are particularly preferred, since inert gas can also diffuse through the membrane separating the anode side from the cathode side of the fuel cell, especially in the case of a PEM fuel cell. This diffusion means that equilibrium is maintained only with equal inert gas concentrations. The greater the deviation in equilibrium, the more processes take place within the fuel cell in order to establish equilibrium.

In a further embodiment of the invention, the recirculated cathode gas and the recirculated anode gas are compressed. Compressing the recirculating gas compensates for the pressure loss inside the fuel cell. The recirculated anode gas can be compressed particularly easily if it contains a constantly high proportion of inert gas, by preference 40 to 70 mol %, preferably 45 to 60 mol %, particularly preferably 45 to 55 mol %, since the anode gas then has a relatively high density, making it technically easier to compress.

In a further embodiment of the invention, the amount of inert gas removed from recirculation with the portion of the cathode gas stream at the output side of the cathode side of the fuel cell and released to the surrounding air is chosen to be equal to the amount of inert gas that is supplied to the recirculation fuel cell device via the oxygen inlet. This corresponds to the steady state.

In a further embodiment of the invention, the concentration of inert gas is kept constant. Constant within the meaning of this invention is a concentration that fluctuates within a range of ±3 vol %.

In a further aspect the invention concerns a submarine with a recirculation fuel cell device in accordance with the invention. The recirculation fuel cell device in accordance with the invention is particularly advantageous for a submarine. A reduction in the release of reactants is particularly advantageous because of the closed environment, the limited volume of surrounding air, and the people working in the immediate vicinity who are unable to leave the environment. Actual risks are minimized by avoiding the release of hydrogen. Reducing the release of oxygen can likewise prevent a rise in the concentration of oxygen, which can also be harmful to the crew.

In a further embodiment of the invention, the recirculation fuel cell device comprises an electrical connection for connection to a DC network of the submarine.

In a further embodiment of the invention, the recirculation fuel cell device provides breathing gases, in particular oxygen, for the air supply to the crew of the submarine via the gas discharge valve.

In a further aspect the invention concerns the implementation of the method in accordance with the invention on board a submarine.

In a particularly preferred embodiment of the invention, the invented method is implemented on board a submarine such that the amount of oxygen released by the release of the portion of the cathode gas stream is adjusted such that it corresponds to or is less than the amount of oxygen consumed inside the submarine.

It has been found that when the invented method is implemented on board a submarine the inert gas concentration is particularly preferably adjusted to 40 to 70 mol %, preferably to 45 to 60 mol %, particularly preferably to 45 to 55 mol %. It has been found that with this inert gas concentration, the energy released by the fuel cell corresponds approximately to the amount of energy required and at the same time the amount of oxygen released corresponds approximately to the amount of oxygen consumed by the crew. Since as a first approximation the energy and oxygen requirement is proportional to the size of the vessel and hence of the crew, this value is roughly independent of the size of the vessel.

The FIGURE is a schematic diagram of an example recirculation fuel cell device.

The FIGURE shows an example of a recirculation fuel cell device in schematic form. The recirculation fuel cell device comprises a fuel cell 10 having a cathode side 11 and an anode side 12. The reduction of $O_2$ to $O^{2-}$ takes place on the cathode side 11, while the oxidation of $H_2$ to $H^+$ takes place on the anode side 12. The cathode gas leaving from the cathode side 11 of the fuel cell 10 is recirculated via a first water separator 21 and a compressor 31. The anode gas leaving from the anode side 12 of the fuel cell 10 is recirculated via a second water separator 22 and a compressor 32. A portion of the cathode gas stream is released to the surrounding air continuously or cyclically via a gas discharge valve 15. Water can be removed from the circuit from the first water separator 21 and the second water separator 22 via a water outlet 85.

For the supply of new reactants, the recirculation fuel cell device has a hydrogen tank 60 and an oxygen tank 70, preferably for liquid oxygen. The oxygen is introduced into the cathode circuit via a first humidifier 51, the hydrogen into the anode circuit via a second humidifier 52. The first humidifier 51 and the second humidifier 52 preferably comprise a water-permeable membrane, preferably made of a sulfonated tetrafluoroethylene polymer, for example Nafion (DuPont) or Flemion (Asahi). The first humidifier 51 is supplied with water separated out in the first water separator 21 via a compressor 41 and a heat exchanger 43. The second humidifier 52 is supplied with water separated out in the second water separator 22 via a compressor 42 and a heat exchanger 44. All other combinations for supplying the humidifiers with water separated out in the water separators are also conceivable of course, in particular that the first humidifier 51 and the second humidifier 52 are supplied with water separated out in the first water separator 21 via the compressor 41 and the heat exchanger 43.

The heat exchangers 43, 44 are preferably operated with cooling water from the fuel cell 10. This embodiment is particularly preferred because the cooling water leaves the fuel cell 10 with the highest temperature, which is at the output side of the fuel cell 10. The water and hence the oxygen or hydrogen introduced with the water are thus already preheated to the correct temperature. The cooling water is adjusted to the temperature prevailing at the input side of the fuel cell 10. This means that no active regulation is required, as the system regulates itself passively.

To start the fuel cell, inert gas can be introduced into the anode gas circuit and the cathode gas circuit via inert gas feeders 80, such that the desired conditions are set.

REFERENCE SIGNS

10 Fuel cell
11 Cathode side
12 Anode side
15 Gas discharge valve
21 First water separator
22 Second water separator
31 Compressor
32 Compressor
41 Compressor
42 Compressor
43 Heat exchanger
44 Heat exchanger
51 First humidifier
52 Second humidifier
60 Hydrogen tank
70 Oxygen tank
75 Superheater
80 Inert gas feeder
85 Water outlet

What is claimed is:

1. A recirculation fuel cell device comprising:
    a fuel cell having an anode side and a cathode side, wherein the anode side has an input side and an output side, wherein the cathode side has an input side and an output side;
    a first inlet for oxygen connected to the input side of the cathode side of the fuel cell;
    a second inlet for hydrogen connected to the input side of the anode side of the fuel cell;
    a cathode-side connection between the output side of the cathode side of the fuel cell and the input side of the cathode side of the fuel cell;
    an anode-side connection between the output side of the anode side of the fuel cell and the input side of the anode side of the fuel cell;
    a first water separator disposed in the cathode-side connection;
    a gas discharge valve disposed on the output side of the cathode side of the fuel cell, the gas discharge valve for a continuous release of process gases; and
    a first oxygen sensor that detects an oxygen concentration in air surrounding the fuel cell device, and wherein fuel cell device is configured, via regulation of the gas discharge valve, to adjust an inert gas concentration based on the oxygen concentration in the surrounding air as detected by the first oxygen sensor, such that the oxygen concentration in the surrounding air is kept constant.

2. The recirculation fuel cell device of claim 1 being configured to recirculate anode gas in its entirety leaving from the output side of the anode side of the fuel cell.

3. The recirculation fuel cell device of claim 1 wherein the gas discharge valve is a throttle valve.

4. The recirculation fuel cell device of claim 1 further comprising:

a second oxygen sensor that detects an oxygen concentration at the output side of the cathode side of the fuel cell.

5. The recirculation fuel cell device of claim 1 further comprising a first humidifier connected to the first inlet for oxygen.

6. The recirculation fuel cell device of claim 2 further comprising a second humidifier connected to the second inlet for hydrogen.

7. A submarine that includes a recirculation fuel cell device comprising:
- a fuel cell having an anode side and a cathode side, wherein the anode side has an input side and an output side, wherein the cathode side has an input side and an output side;
- a first inlet for oxygen connected to the input side of the cathode side of the fuel cell;
- a second inlet for hydrogen connected to the input side of the anode side of the fuel cell;
- a cathode-side connection between the output side of the cathode side of the fuel cell and the input side of the cathode side of the fuel cell;
- an anode-side connection between the output side of the anode side of the fuel cell and the input side of the anode side of the fuel cell;
- a first water separator disposed in the cathode-side connection;
- a gas discharge valve disposed on the output side of the cathode side of the fuel cell, the gas discharge valve for a continuous release of process gases; and
- a first oxygen sensor that detects an oxygen concentration in air surrounding the fuel cell device, and wherein fuel cell device is configured, via regulation of the gas discharge valve, to adjust an inert gas concentration based on the oxygen concentration in the surrounding air as detected by the first oxygen sensor, such that the oxygen concentration in the surrounding air is kept constant.

8. The submarine of claim 7 wherein the recirculation fuel cell device provides breathing gases for an air supply to a crew of the submarine via the gas discharge valve.

9. The submarine of claim 7 wherein the recirculation fuel cell device is operated by
- recirculating cathode gas in a cathode gas stream;
- continuously removing a portion of the cathode gas stream from recirculation at the output side of the cathode side of the fuel cell;
- releasing the removed portion of the cathode gas stream to surrounding air; and
- recirculating anode gas in an anode gas stream in its entirety.

10. The submarine of claim 9 wherein an amount of oxygen released by the release of the removed portion of the cathode gas stream is adjusted so that the amount of oxygen released corresponds to or is less than an amount of oxygen consumed inside the submarine.

* * * * *